(12) United States Patent
Schröder et al.

(10) Patent No.: US 11,552,826 B2
(45) Date of Patent: Jan. 10, 2023

(54) METHOD FOR THE OPERATION AND EXPANSION OF A NETWORK OF LIGHTS

(71) Applicant: SCHREDER, Brussels (BE)

(72) Inventors: Helmut Schröder, Wiesbaden (DE); Daniel Brand, Cologne (DE); Didier Wellens, Kraainem (BE)

(73) Assignee: SCHREDER, Brussels (BE)

(*) Notice: Subject to any disclaimer, the term of this patent is extended or adjusted under 35 U.S.C. 154(b) by 64 days.

(21) Appl. No.: 16/781,386

(22) Filed: Feb. 4, 2020

(65) Prior Publication Data

US 2020/0253027 A1  Aug. 6, 2020

Related U.S. Application Data

(63) Continuation of application No. 15/862,936, filed on Jan. 5, 2018, now Pat. No. 10,561,002, which is a
(Continued)

(30) Foreign Application Priority Data

Nov. 10, 2014  (EP) .................................. 14192580

(51) Int. Cl.
 *H04L 12/64* (2006.01)
 *H05B 47/23* (2020.01)
 (Continued)

(52) U.S. Cl.
 CPC ...... *H04L 12/6418* (2013.01); *H04B 10/1129* (2013.01); *H05B 47/105* (2020.01);
 (Continued)

(58) Field of Classification Search
 CPC ..... H04L 12/6418; H05B 47/13; H05B 47/19; H05B 47/16; H05B 47/18; H05B 47/105;
 (Continued)

(56) References Cited

U.S. PATENT DOCUMENTS 3,010,319 A1   8/2011   Walters et al.
3,820,952 A1   9/2014   Agrawal
(Continued)

FOREIGN PATENT DOCUMENTS

CA   2879419 A3   1/2014
CN   103476168 A   12/2013
(Continued)

OTHER PUBLICATIONS

Communication pursuant to Article 19(43) of EP Appln. No. 19150716.9 dated Jan. 25, 2022.

*Primary Examiner* — Dedei K Hammond
(74) *Attorney, Agent, or Firm* — Browdy and Neimark, P.L.L.C.

(57) ABSTRACT

Method for the operation and expansion of a network of lights Described herein is method for the operation and the expansion of a network of lights, each light in the network including a control module which is assigned to a group, each control module being in communication with a group controller as well as control modules in the same group. The network can be expanded by installing new lights with their associated control modules (19), and each new control module scans its environment and transmits environmental information to a central server (20) where the environmental information is analysed and the new control modules are allocated into groups (21). After allocation to a group in which control modules may be moved from one group to another or a new group is formed, the new control modules are available for normal operation. This process is repeated for each new light and associated control module.

18 Claims, 7 Drawing Sheets

Related U.S. Application Data continuation of application No. 15/590,729, filed on May 9, 2017, now Pat. No. 9,894,739, which is a continuation-in-part of application No. PCT/EP2015/076147, filed on Nov. 10, 2015.

(51) Int. Cl.

| | | |
|---|---|---|
| *H05B 47/19* | (2020.01) | |
| *H05B 47/16* | (2020.01) | |
| *H05B 47/18* | (2020.01) | |
| *H05B 47/105* | (2020.01) | |
| *H05B 47/13* | (2020.01) | |
| *H04B 10/112* | (2013.01) | |
| *H04W 24/04* | (2009.01) | |

(52) U.S. Cl.
CPC ............. *H05B 47/13* (2020.01); *H05B 47/16* (2020.01); *H05B 47/18* (2020.01); *H05B 47/19* (2020.01); *H05B 47/235* (2020.01); *H04W 24/04* (2013.01)

(58) Field of Classification Search
CPC . H05B 47/235; H04B 10/1129; H04W 24/04; Y02B 20/40
See application file for complete search history.

(56) References Cited

U.S. PATENT DOCUMENTS

| | | | | |
|---|---|---|---|---|
| 10,509,101 | B2* | 12/2019 | Hartman | ................ G01S 13/88 |
| 2009/0066540 | A1 | 3/2009 | Mariknakis et al. | |
| 2009/0222241 | A1* | 9/2009 | Dorogi | ................... H05B 47/19 |
| | | | | 702/182 |
| 2010/0029268 | A1* | 2/2010 | Myer | ...................... F21S 9/043 |
| | | | | 455/426.1 |
| 2010/0238001 | A1 | 9/2010 | Veskovic | |
| 2011/0001438 | A1* | 1/2011 | Chemel | ................ H05B 47/155 |
| | | | | 315/297 |
| 2011/0134794 | A1 | 6/2011 | Sims et al. | |
| 2011/0215735 | A1* | 9/2011 | Herbst | ................... H05B 47/10 |
| | | | | 315/297 |
| 2012/0079074 | A1 | 3/2012 | Mccormack | |
| 2012/0147604 | A1* | 6/2012 | Farmer | ............... F21V 23/0435 |
| | | | | 362/249.03 |
| 2013/0057158 | A1 | 3/2013 | Josefowicz et al. | |
| 2013/0057181 | A1 | 3/2013 | Bernard | |
| 2013/0088153 | A1 | 4/2013 | Lagutko | |
| 2014/0197745 | A1 | 7/2014 | Agrawal | |
| 2016/0113094 | A1 | 4/2016 | Wagner | |
| 2016/0156765 | A1 | 6/2016 | Garcia Marcho | |

FOREIGN PATENT DOCUMENTS

| | | | |
|---|---|---|---|
| JP | H0521167 A | 1/1993 | |
| JP | H10154585 A | 6/1998 | |
| JP | 2001273359 A | 10/2001 | |
| JP | 2012199011 A | 10/2012 | |
| JP | 2012529834 A | 11/2012 | |
| WO | WO-2012048532 A1 * | 4/2012 | ......... H05B 37/0218 |
| WO | 2013034362 A1 | 3/2013 | |
| WO | 2013/061189 A1 | 5/2013 | |
| WO | 2014/077773 A1 | 5/2014 | |
| WO | 2015000803 A1 | 1/2015 | |

* cited by examiner

METHOD FOR THE OPERATION AND EXPANSION OF A NETWORK OF LIGHTS

The present invention relates to a method for operating, particularly for controlling, and expanding a network of lights, in which case the lights are in particular street lights.

Networks of lights are equipped with increasingly intelligent control systems. For instance, networks of lights can be operated by tele-management systems, in which a device known as segment controller, which is connected to a management console on a PC, controls a number of lights via their control module. The segment controller, which is too large to be integrated into a light, must be set up such that the lights to be controlled can communicate with the controller via a short-distance communication module. A failure of the segment controller leads to a control failure of the light network.

There is also the method of equipping all light control modules of the network to be controlled with a long-distance communication module, for instance a GSM-based module, which the control modules use to communicate with a central server. Due to the large number of control modules actively integrated into a provider or long-distance communication network, relevant communication expenses arise when this network is used.

Furthermore, the commissioning/start-up of new lights within these known systems is costly, as particularly the GPS-supported allocation of the controller to a light must be carried out manually. Finally, the latency in the network is comparatively high due to the large number of lights controllable by a segment controller.

The invention described herein aims to create a method for operating and expanding a light network, which is easier to start up, guarantees improved system stability and is furthermore cheaper to operate.

The task is solved by a method described in embodiment 1 as well as a network described in embodiment 31. Advantageous embodiments of the invention are described in the sub-embodiments referring to the above-mentioned embodiments as well as the following description.

The method according to this invention facilitates operation of a stabler and less costly light network with a simplified installation process. The method according to this invention makes use of multiple control modules, each of which is allocated or is to be allocated to one light and each of which is equipped with a long-distance communication module (e.g. GSM, GPRS, Iridium or another cellular network or an Ethernet connection), a short-distance communication module (ZigBee, 6 LoWPAN or similar), preferably a near field communication module (especially with a near field sensor), a geocoordinates module to determine the position of the control module based on GPS, GLONASS Galileo or other in particular satellite based positioning systems, a controller, preferably at least one sensor and additionally a control output (e.g. on a DALI or 0 resp. 1 to 10 volt basis). The control output can transmit control signals to a driver of an illuminant of the light, preferably a street light.

Furthermore, the network is equipped with at least one server to be reached via the long-distance communication module. A suitable software for tele-management can run on this server. For operating the network, the control modules are divided into one or more groups of control modules, with this division being based on information provided by the control modules concerning the environment, lights and/or control modules. The long-distance communication module can be based on different techniques. For example it could be a cellular network, an IP-network or a long range peer to peer network. The division of the control modules into one or more groups of control modules is preferably performed by the server.

As environmental information, in addition to geocoordinates, information regarding adjacent control modules in the short-distance network (e.g. connection quality and other RF characteristics or neighbourhood tables) and/or environment-specific information (e.g. light intensity in the surroundings) may be taken into consideration. The information concerning the lights may be information regarding the illuminants used, their drivers and/or further details of the allocated light, e.g. the current light intensity or dimming. The control module information is particularly information used for clear identification of the control module, such as its IP address or another UID (Unique IDentifier). According to this invention, the server selects one control module per group, or in case of a single group of the group, as group controller. The other control modules of the corresponding group use their short-distance communication modules to communicate with this controller. This means communication within a group uses the corresponding short-distance communication modules. Within the group, the control modules of the group form a short-distance network via their corresponding short-distance communication modules, preferably a mesh network. During (normal) operation of the network, the group controller can only transmit its own environmental, light and/or control module information and the information received from its other control modules to the server via the long-distance communication module. For both, the methods described above and below, transmission of information is always executed through transmission of the corresponding data on the basis of specific communication protocols.

During normal operation of the network, the group controller can only transmit its own environmental, light and/or control module information and the information received from its other control modules to the server via the long-distance communication module. For this purpose, normal operation is understood as the usual operation of the network, in which each control module of the network is allocated to a group and in which all control modules carry out their actual task, controlling the light.

A network set-up like this leads to a more stable operation than previous network systems. Due to the redundant set-up of the respective control modules within a group, a new group controller can easily be determined by the server in case of a group controller failure. Once the new group controller has been announced within a group, i.e. on the level of the short-distance communication network (PAN=Personal Area Network), the other control modules not defined as group controllers establish their connections via the group controller. This means that the server can continue to control and monitor the system. At the same time, the single active control module (group controller) per group makes expenses significantly lower than in a network where all control modules communicate separately with the server via their respective long-distance module.

The set-up of the internal group network as mesh network makes the system and communication on the PAN level more fail-safe.

If "with" is used above or below to explain process steps, this does not necessarily mean that the connected process steps are simultaneous. Rather, these process steps may (but do not have to) be simultaneous.

The expansion of the network is furthermore made easier if the network automatically records geo-information, particularly during initial commissioning/start-up, preferably when voltage is first applied, as it then carries out this process automatically after a new control module is switched on. This geo-information consists of location data, i.e. coordinates and a precise time stamp The geo-information is registered by means of the geocoordinates module. At the same time or subsequently, the long-distance communication module logs in with a network provider. Preferably this should be a provider of communication lines, e.g. a cellular network provider. A long distance communication network usually would be at least a cellular network. This log-in can take place under roaming conditions, which means that, regardless of where the respective control modules are to be set up at a later time, the factory must always only provide identical log-in information. Therefore, the controller and/or long-distance communication module have consistent log-in data on the control module side.

After log-in with the network provider, the geo-information can then be transmitted to the server together with information regarding the control module and/or lights provided by the new control module. The automatic storage of the data in a corresponding database by the server facilitates uncomplicated set-up of street lights. To reduce communication costs, provider access data specific to an existing long-distance network can be transmitted after the new control module's information has been transmitted.

The processes described above and below also apply to the integration of several new control modules.

In particular, the provider access data can be provided to the new control module via firmware, if it is equipped with an electronic SIM. In this case, the new firmware is transferred to the controller or the long-distance communication module, so that commissioning/start-up of the new control module becomes possible at low cost and under local conditions. Accordingly, provision of firmware by the server can achieve flexible communication and installation of the new control modules without them having to be equipped differently by the factory.

To simplify the management of a multitude of networks, in particular of street lights, it is beneficial to carry out allocation to a group and further data exchange with the new control module via a dedicated project server after the initial commissioning of the new control module and its first log-in on a log-in server.

A server in this case is not necessarily a separate data processing system with separate hardware. It can also merely be a project-specific separation within a tele-management program. It may also be a virtual server on the same hardware or within a cloud.

To facilitate problem-free operation, the project server could preferably be provided with information about the commissioned devices by the log-in server after the initial log-in.

To lower costs, an interface from the server to the long-distance network provider or the network provider should preferably be used to transfer information regarding the control modules active within their long distance communication, to be suspended and/or to be made inactive. This means that the provider guarantees that only a low number of control modules (one control module per group) is active. The other control modules can only communicate with the server via the communication path within the mesh network and then via the group controller. A suspension, especially of an electronic SIM, means that it can be activated for a short time in case of doubt, for instance if the group controller fails. Preferably the network compensates for the failure of one communication path and establishes a new one automatically and thus with a minimum delay. The new communication can be initiated through a corresponding request by the server or through a time-controlled inquiry and an attempt to access the provider network by the control module.

The server can then transmit information to the other control modules, making these control modules communicate with the new group controller during normal operation.

To set up a mesh network, it can be advantageous for the respective group controller to receive data about the members of its group, especially new control modules, from the server and for the group controller to determine itself as group controller in relation to the other group members. As an alternative or in addition, the other group members may receive data about the communication path or the desired group controller to ensure that communication with the server remains problem-free.

Accordingly, the information provided by the server can be information for the control modules, which informs these about adjacent control modules of the same group. The server may, for instance, extract this data by observing the geocoordinates of the respective control modules.

After a successful initialisation or expansion of the mesh network, the group controller can transmit this message to the server. The server can then continue to guide the expanded group in normal operation.

To signal successful commissioning/start-up, for instance successful integration of a control module into the group network (PAN) or successfully established contact with a server, to the operating personnel when a new light or a new control module is installed and/or after maintenance work on the respective light, the control module can operate the light at different brightness levels over predetermined or determinable time intervals once the desired state has been reached.

Preferably the new control module receives a parameter set for operating the light from the server after initial installation and/or re-installation. This set may, for instance, consist of dimming curves.

Furthermore, operation of a network of lights is improved, if the control modules of a group are provided with software updates by a software transmitted from the server to the group controller and subsequently or simultaneously transmitted further. This may, for example, make new light functions possible or release them for use.

As an alternative, a control module may receive a new controller software, in particular firmware, directly from the server, by-passing the group controller. However, for this purpose the respective control module must first be reactivated with the provider.

To facilitate the fastest possible start-up of the network without delays, possible new control modules can scan the short-distance network for other control modules automatically after they are first started up, thereby creating an internal table of adjacent modules which contains the closest adjacent modules in the short-distance network. This list can later be transmitted to the server. In particular, this adjacent module information can be transmitted to the server together with other light-specific or control module-specific information after the mesh network is set up and a group controller has been allocated.

For fail-safe operation and problem-free expansion of the network, it is beneficial if at least a part of the control modules, preferably in one group and specifically in response to a server request, receive information about adjacent control modules via the short-distance communication module, depending on the number of new control modules, the closeness of the new control modules, the distance of new control modules from the group controller and/or the frequency of disruptive events. These control modules shall register the quality of the connection to the adjacent control modules and transmit this information to the server via their short-distance communication module and the group controller or directly via their long-distance communication module, which will cause the server to make the group division and determine the group controller, check this division/determination and/or change it, if necessary.

To do so, the control modules may switch to another PAN-internal communication mode and contact adjacent control modules via the respective short-distance communication module and register these as well as the quality of their connection to them.

The registration of adjacent module information can be time-limited. Once a specific time has elapsed and/or after identification of a specified number of closely adjacent modules, this information can be transmitted to the group controller via the respective short-distance communication module or, if the connection is active, to the server via the long-distance communication module, possibly together with other geo- and/or light- and/or control module-specific information. The server can use this information to check the group division and group controller allocation and/or revise it, if necessary.

A particular advantage for network installation is achieved through a process in which, preferably for transmitting light-specific information, an information medium for registering light-specific information located on part of the light is read out by the control module automatically and/or after being triggered. This information medium may be a chip, a memory card, an RFID tag or similar information carriers which can be read out without being touched. Preferably the information medium will be read out by a near field sensor of the control module without being touched. For instance, this may be an RFID reader, which communicated with an RFID transponder or tag. The read-out information can be used by the control module to select specific operating parameters, or it can merely be transferred to the server, for instance so that operating parameters can be transferred from there.

Maintenance of a light network according to this invention is also improved, if the light-specific information of the new control module is linked with a inventory list on the server, preferably with the contents of this list, at least partially being displayed if a component of the light fails. The individual components of the light may be equipped with a link to a web shop or a different ordering method so that potentially inoperative parts can be ordered without a delay.

Instead of observing information about their short-distance network environment on the basis of malfunctions or a request based on the number of new control modules of a group, the modules can preferably register this information at a pre-determined time and/or due to an initialisation by the server. For this purpose it may be helpful to limit communication within the mesh network via the group controller to the server for a short time and only allow observation and communication with the closest adjacent modules in the mesh network based on the short-distance module and the respective protocol. This serves to create neighbourhood module tables or lists, with information about the signal strength and/or quality of the connection to the respective adjacent modules being registered at the same time. This information can be cached and/or stored and then transmitted via the group controller or, if all long-distance communication modules of the control modules are active, transmitted directly to the server.

For targeted inspection or checking the status of several control modules, these should preferably be pre-selected by the server before a predefined inquiry, a process in which for instance the control module concentration can be determined and checked on the basis of a pre-defined or definable limit value. Subsequently, if the limit value is exceeded, a redetermination of the environment, light and/or control module specific information can be initialised.

To enable the server to select a suitable group controller and integrate new control modules optimally, it may be beneficial to have the respective control modules register and save data concerning their UID in the short-distance network, their IP address in the long-distance network, their UID in the near field network, light-specific information, data of a number of neighbours in the short-distance network, particularly of up to 50, preferably of up to 10 adjacent control modules in the short-distance network including their UI Ds and/or the connection quality of the adjacent control modules during a scan process and then have this information (data) transmitted via the group controller to the server at a given time. If the control module is active, i.e. equipped with an active long-distance network access, the server may receive this information directly from the control module.

The commissioning of the network and the division into groups and/or allocation of the group controller on the server should preferably be carried out automatically. As an alternative or in addition, the division into groups and/or allocation of the group controller may be varied by user input. For instance, this is beneficial if a program running on the server causes an ambiguous selection of a group controller.

To keep the latency in the network under a desired level, a maximum definable number of control modules should preferably be allocated to each group being set on the server, with 200 control modules potentially being the upper limit. Tests and simulations with up to 2000 lights have shown that the latency in larger network groups becomes too large to guarantee proper operation and regular inspection of the network status.

Preferably the number of control modules should be less than 200 per group, particularly less than 50 control modules.

Furthermore the stability of the system is improved sufficiently if the selection of a controller as group controller based particularly on fuzzy control strategies is automatic. Accordingly the suspension or deactivation of a control module based on fuzzy control strategies can also be automatic.

In particular, the selection of the group controller and/or allocation of the control modules to their respective group can take into account at least some of the rules for:
  the ratio of active to inactive control modules,
  the availability of adjacent control modules in the short-distance network,
  the number of network malfunctions,
  the network changes (new control modules in relation to deleted control modules),
  the changes of connection quality in the short-distance network,
  the estimated cost of connection to the long-distance network provider,
  the communication of sensor data between adjacent groups, the latency within a group (including distance-dependent delay), fall-back options (replacement of failed group controllers) and/or a stabilisation component to take into account a time-controlled damping.

Preferably the rules are mapped and linked by an AI system. A simple combination of these rules can be based on logic operations, e.g. AND/OR/NOR combinations.

Furthermore, the fail safety is increased if at least one replacement group controller is defined by the server according to the control strategies, which switches from a suspended to an active state if the actual group controller fails.

To make detection of environment information by the short-distance network and communication in the short-distance network for purposes of the normal operation (communication with the server) more problem-free, it may be beneficial for the corresponding communication in the short-distance network to take place on different frequency bands of said network. Preferably the same antennae can be used for this (multiplex operation).

According to a further development of the method according to this invention, information relevant for multiple groups can be exchanged between adjacent groups. To ensure that particularly sensor information relevant for multiple groups or data relevant for multiple groups based on sensor information can be transmitted fast, for instance information regarding the lighting situation for a driving car or a pedestrian, it is beneficial if the respective information can be transmitted directly via the long-distance network to a control module of an adjacent group, by-passing the server. In particular, this information can be transmitted directly from the control module equipped with the sensor which created the information. Accordingly, the communication can be carried out via the long-distance network provider, but does not have to use the server. For protocol purposes the server can be informed of the respective information. In particular, transmission of this information uses the known group controllers in the long-distance network.

As an alternative, data relevant for multiple groups based on sensor information can be transmitted directly via the short-distance network to a control module of an adjacent group, by-passing the server, with transmission of the date preferably using a different frequency band than the one used during normal operation within one group. For this purpose, multiplex operation of the short-distance module can, once again, be an advantage.

It is beneficial for the server, if in the corresponding software a group-independent selection of control modules for the exchange of data relevant for multiple groups can be made. This can be supported graphically, for instance if those control modules which are to exchange sensor information are marked on an overview map. This makes it possible for large crossroads on the border of adjacent groups equipped with control modules belonging to different groups to be marked, to quickly increase the lighting volume in the driving direction of an approaching car.

A network according to this invention designed as described above and below also has the corresponding advantages.

For further advantages and detailed features of the invention, refer to the following figure descriptions. The schematic figures show.

Individual technical features of the design examples described below can also be combined with design examples described above as well as the features of independent embodiments and potential further embodiments to form objects according to this invention. If it makes sense, functionally equivalent elements are given the same reference number.

The present invention comprises a network comprising a plurality of luminaires, each luminaire having a controller or control module for controlling the operation thereof, and a server. Each controller is connected over an GSM Modem or a low power radio network (LPRN) and decides how best they can communicate to the server. In a preferred embodiment, the controllers are able to form small networks with a group controller, the group controller having an active GSM modem which is shared within the small network and through which communication is made with the server over a provider GSM network.

As each controller communicates with the group controller, there is no need for more than one active GSM modem to be present in each small network with the advantage that costs can be reduced (GSM network costs). Each controller uses the LPRN to communication to its group controller using 6LoWAN using an IPv6 protocol. As a result, each small network comprises an internet protocol version 6 (IPv6) network and communication within the network is only using IPv6 protocols.

The server also operates using IPv6 protocols. However, to transmit information from each group controller to the server, a GSM network is needed and currently, these operate using internet protocol version 4 (IPv4) protocols. This means that communication between the group controller and the server needs to be converted from IPv6 to IPv4 for transmission over the GSM network and then converted back again at the server. In addition, the communication over the GSM network is encrypted and secure, the encryption being provided in accordance with a suitable encryption protocol.

The server can decipher the encrypted communications received from group controllers over the GSM network and can also encrypt communications for transmission to the group controllers over the GSM network. This provides an end-to-end encrypted communication between the group controllers and the server.

Figure 1:
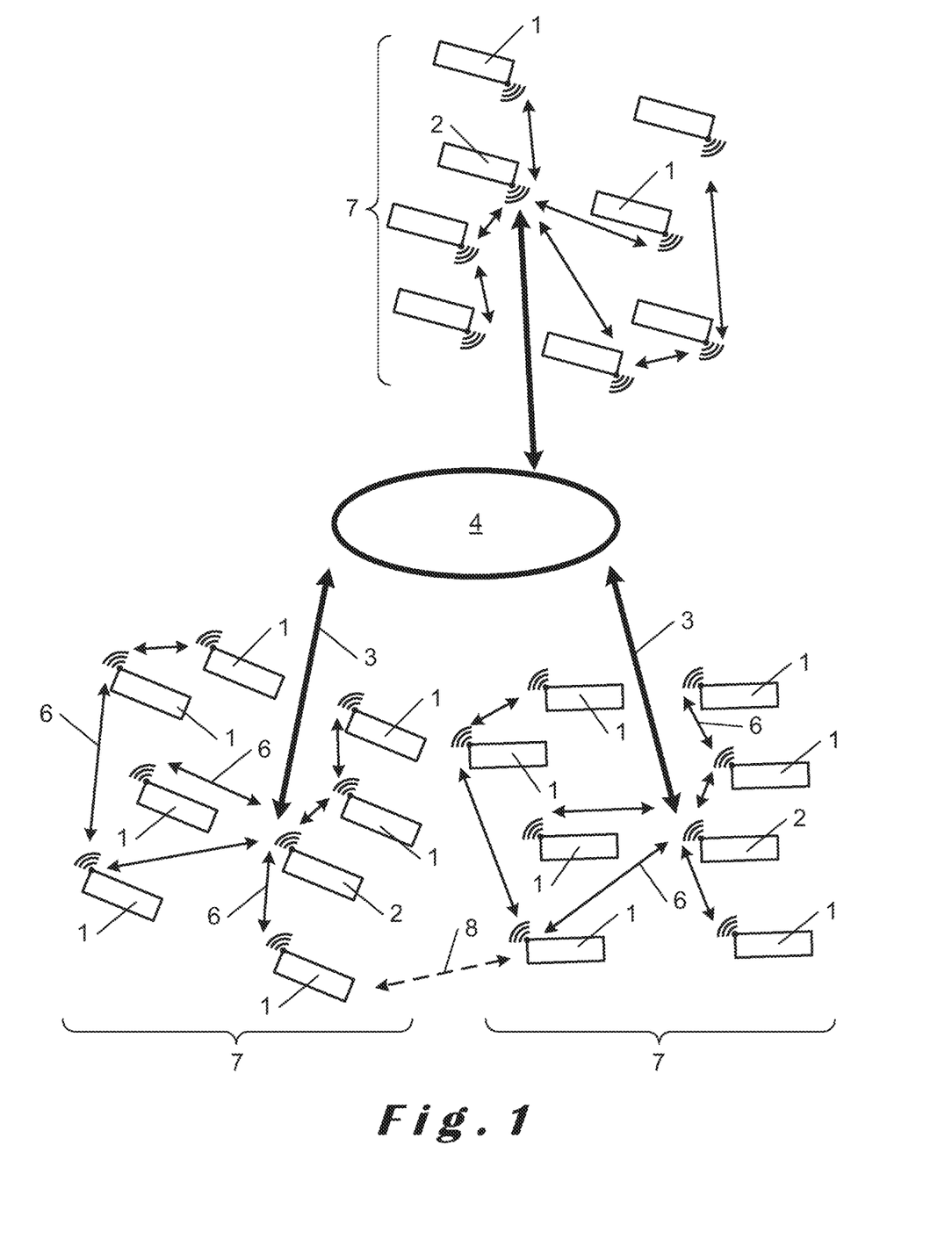
FIG. 1: a network according to this invention.

The method for operation and expansion of a network of lights according to this invention results in the system depicted in a simplified manner in FIG. 1 with a multitude of control modules 1, each of which are allocated to a control module designated as group controller 2. The hardware of group controller 2 is identical to control modules 1. However, only the respective group controller 2 can use long-distance connection 3 to communicate with a server 4. The other control modules 1 of a group are suspended and/or inactive for long-distance communication. Typically this is access to a local cellular network provider, through which the server can then remain accessible based on IP-WAN. Communication between the servers and group controllers can, for instance, be carried out via a common internet protocol (TCP/IP). As described above, this communication is using IPv6 protocol, and communication between the server and the group controllers involves tunnelling between IPv6 and IPv4 for transmission onto the GSM network, a communication using IPv4 over the GSM network, and a tunnelling between IPv4 and IPv6 at the server.

It will readily be understood that the requirement for the conversion/tunnelling between IPv6 and IPv4 and back again is due to the GSM network operating at IPv4. However, in the future, once the GSM network operates at IPv6, there will be no need for this conversion/tunnelling.

It will also be appreciated that in other embodiments of the present invention, the group controller and the server may operate on the same version of IP protocol as the GSM network.

Within a group 7, the control modules communicate with each other via short-distance connections 6. Preferably this communication should be based on a mesh network on the IEEE 802.15.4 standard, for example ZigBee.

The individual groups 7 of control modules 1, 2 can generally not see each other and therefore cannot interfere with each other. However, for communication of several groups it may be intended for control modules with adjacent locations to use short-distance connection 8 to share/exchange or forward sensor data or corresponding information between groups. This can then be used to initiate actions such as an increase of the light volume. As an alternative, this communication may also use the corresponding group controllers 2, which can see each other through their IP addresses in the inter- or intranet. The information regarding which control module may communicate with which other control module and how this module can communicate is defined on the server and carried out, for instance in case of short-distance communication between groups, in particular by means of a multiplex unit of each control module.

Furthermore, a server for operating a network according to this invention can control a state-of-the-art network with a segment controller 15 (FIG. 2) in addition to connecting to one or several groups 7 of control modules 1, 2, which form a PAN. This segment controller manages several light controllers 9. The segment controller 15 is connected via an interface 11, which makes data exchange with server 4 possible. In addition to a connection to several groups 7 via, if necessary, an additional interface 12, the server 4 can exchange data with a long-distance network provider 14 via another interface (API) 13.

Figure 2:
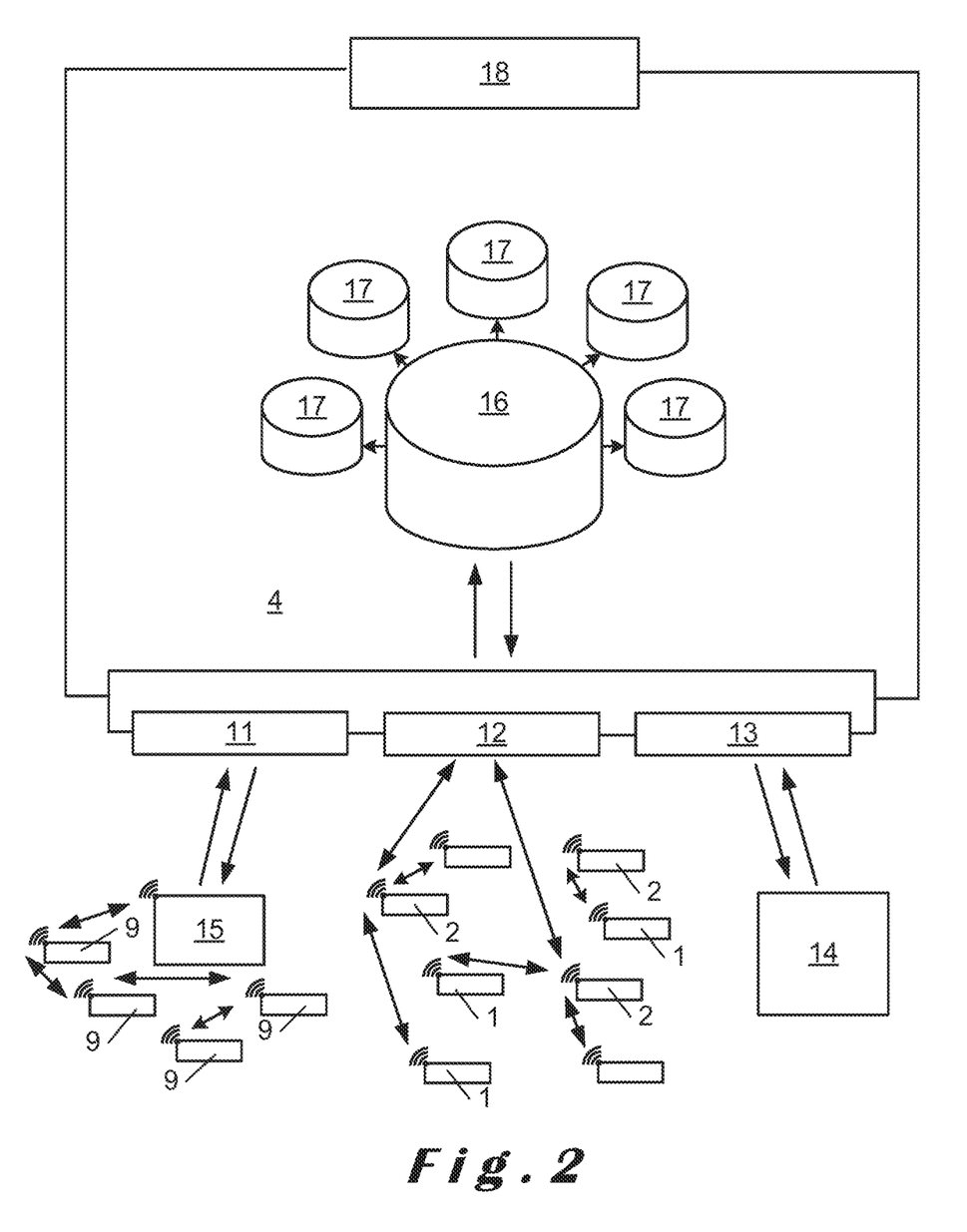
FIG. 2: a further object according to this invention.

In general, a database 16 runs on the server, interacting with different operating modules (clients) 17. A graphical user interface 18 grants the user access to the server and its programs for operation and control purposes.

Figure 3:
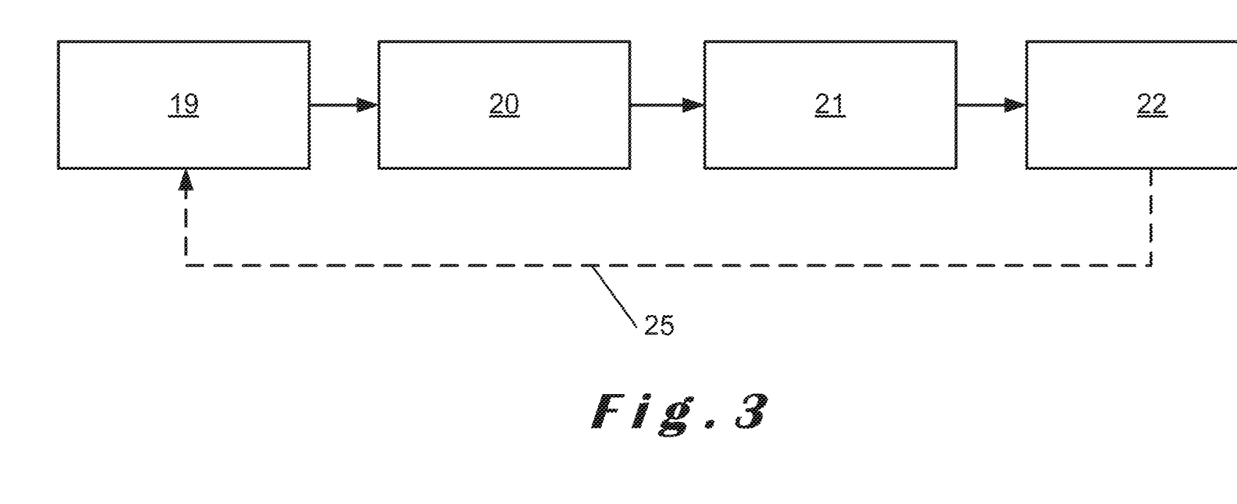
FIG. 3: a simplified flow diagram for a process according to this invention.

FIG. 3 briefly describes the process of setting up a network of street lights. After installation 19 of a number of new control modules on street lights, these will scan their environment in phase 20 which is either started by the server or starts automatically. They then transmit environment information and possible light-specific or control module specific information to the server. This can take place either directly under roaming conditions with a first provider or, if necessary, with a local network provider determined by the server after the first log-in of the respective control modules. Once the environmental and other information has been transmitted by the respective control modules of the street light, an analysis of the control modules and allocation 21 into groups takes place. On the PAN level, integration of one or more new control modules can be dynamic on the basis of the standard in use. Once the respective group controller has transmitted a data signal to the server, informing the server that the internal group communication with the new control module has been successfully established, the system switches over to expanded normal or usual operation 22.

If additional control modules in a quantity pre-determined on the server have been installed, the process can be carried out again according to feedback loop 25, in which case a new division into groups or new allocation of a group controller can take place based on the transmitted information and the rules available to the server.

Figure 4:
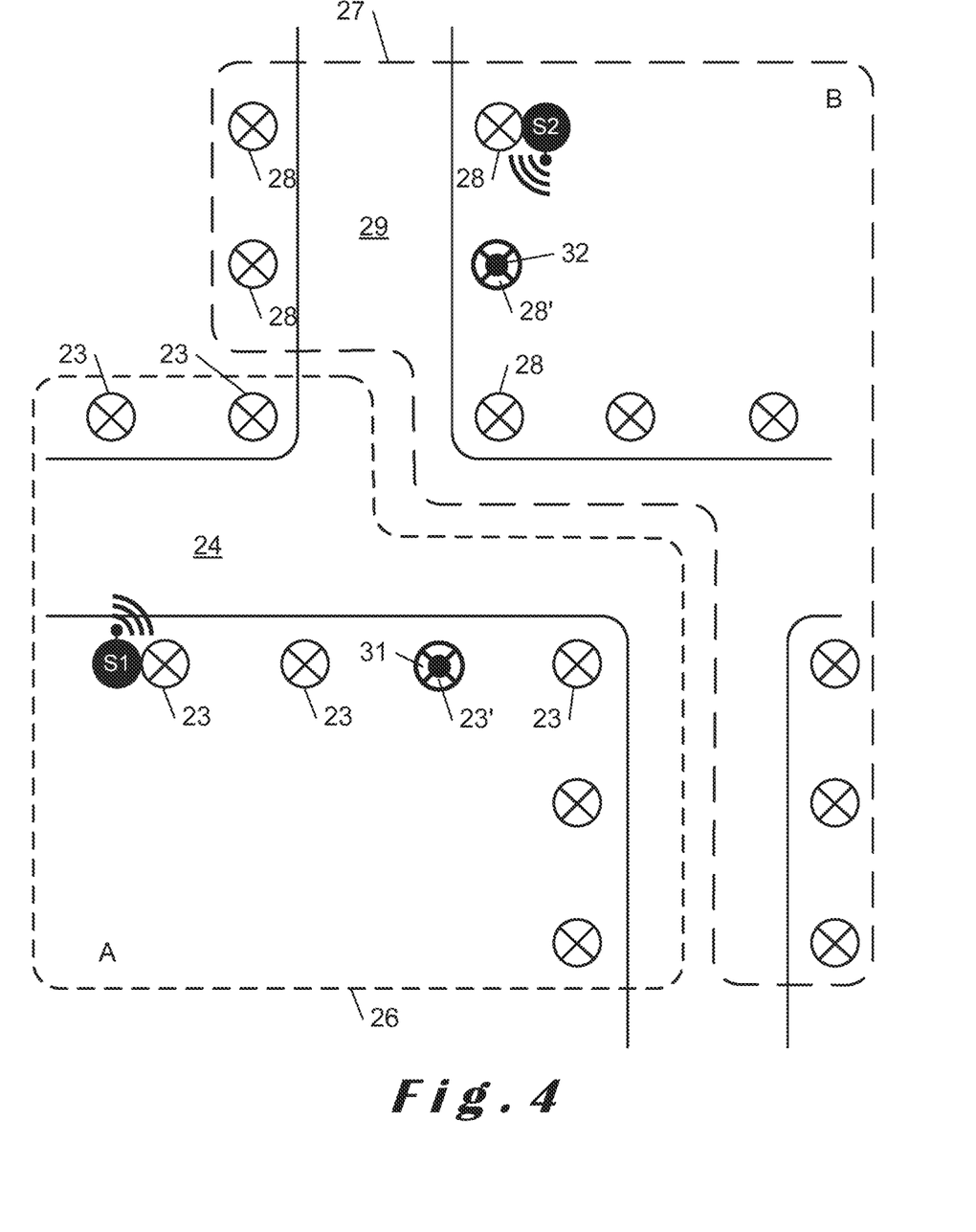
FIG. 4: a further object according to this invention.

According to another design example of the invention according to FIG. 4, a number of lights with their respective control modules 23 and 23' are arranged along a street 24. These lights belong to a group of lights or control modules A, which was pre-determined on the server. Both group A and group B are marked by the broken lines 26 or 27. Group B contains lights with their corresponding control modules 28 or 28' which are placed alongside an intersecting street 29 leading into street 24. The inner black circles 31 and 32 mark a light with an active control module, a group controller. Sensors S1 and S2 are allocated to control module 23 and 28 respectively. As sensors, above all, radar sensors, infra red sensors (particularly passive infra red sensors) or induction loops in street 24 or 29 may be considered. These detect an approaching object, leading to the control modules both within a group and between groups adapting the light of the respective street light of the group to the situation.

For instance, sensor S1 of the control module 23 of street light detects an approaching object, e.g. a car, the information is shared in group A, the light intensity of group A is increased by control modules 23 and 23' and this information or the information about the approaching car is transmitted via group controller 23' to the group controller 28' of group B. Subsequently, the brightness of the relevant lights of control modules 28 or 28', i.e. those selected by the server, is adjusted as well. As an alternative, the control module 23 equipped with sensor S1 could communicate directly with the group controller 28' of group B or another control module 28 of a street light allocated to this group controller, which means that this information is shared in the network and group B reacts accordingly.

Allocation of the respective control modules and therefore the corresponding street lights of a first group, which are to be provided with sensor information of an adjacent group's sensor and through which the information is then transmitted between groups, can be carried out on the server. Input masks are available for this purpose, particularly on the server.

Figure 7:
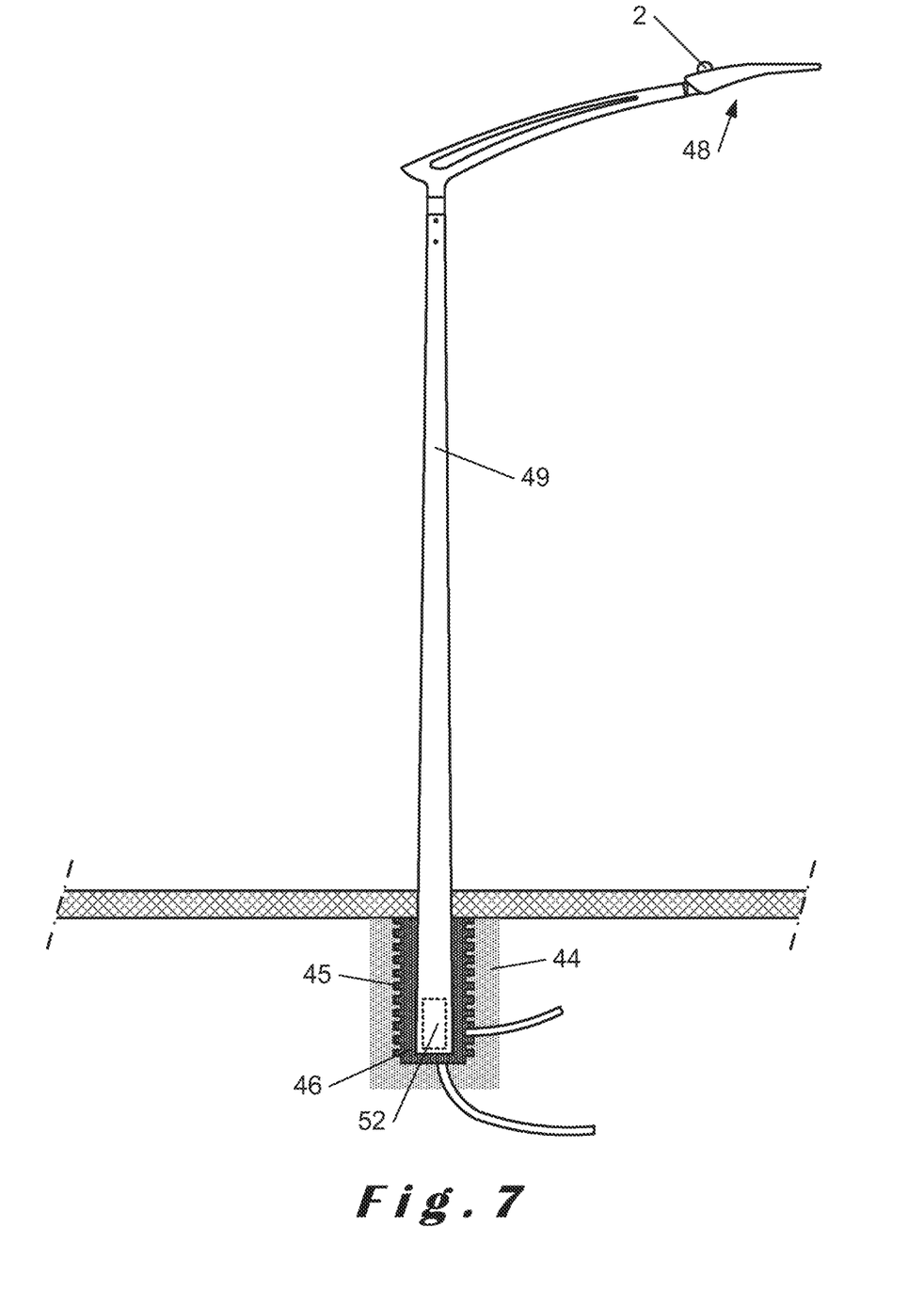
FIG. 7 shows a part of a subject matter according to the invention according to FIG. 6.

A control module according to this invention, which can be used to implement the method described above, is preferably designed as a separate unit, which can be installed on a light head, for instance of a street light (cf. FIG. 7). For further details regarding the crucial components of an externally installed control module, see FIG. 5. The exploded view of this figure comprises the control module, a top housing part 33 and a bottom housing part 34. The bottom housing part is to be fastened to a base fitted on top of the light by means of seal 36. The part is connected with the base through bayonet-type twisting contacts 37. These contacts 37 are fastened in housing 34 and also the location of the central circuit board unit 38. Among other things, a controller 39, short- and long-distance communication modules and an acceleration sensor unit 41 for detecting in particular seismic waves are located on this circuit board unit.

Figure 5:
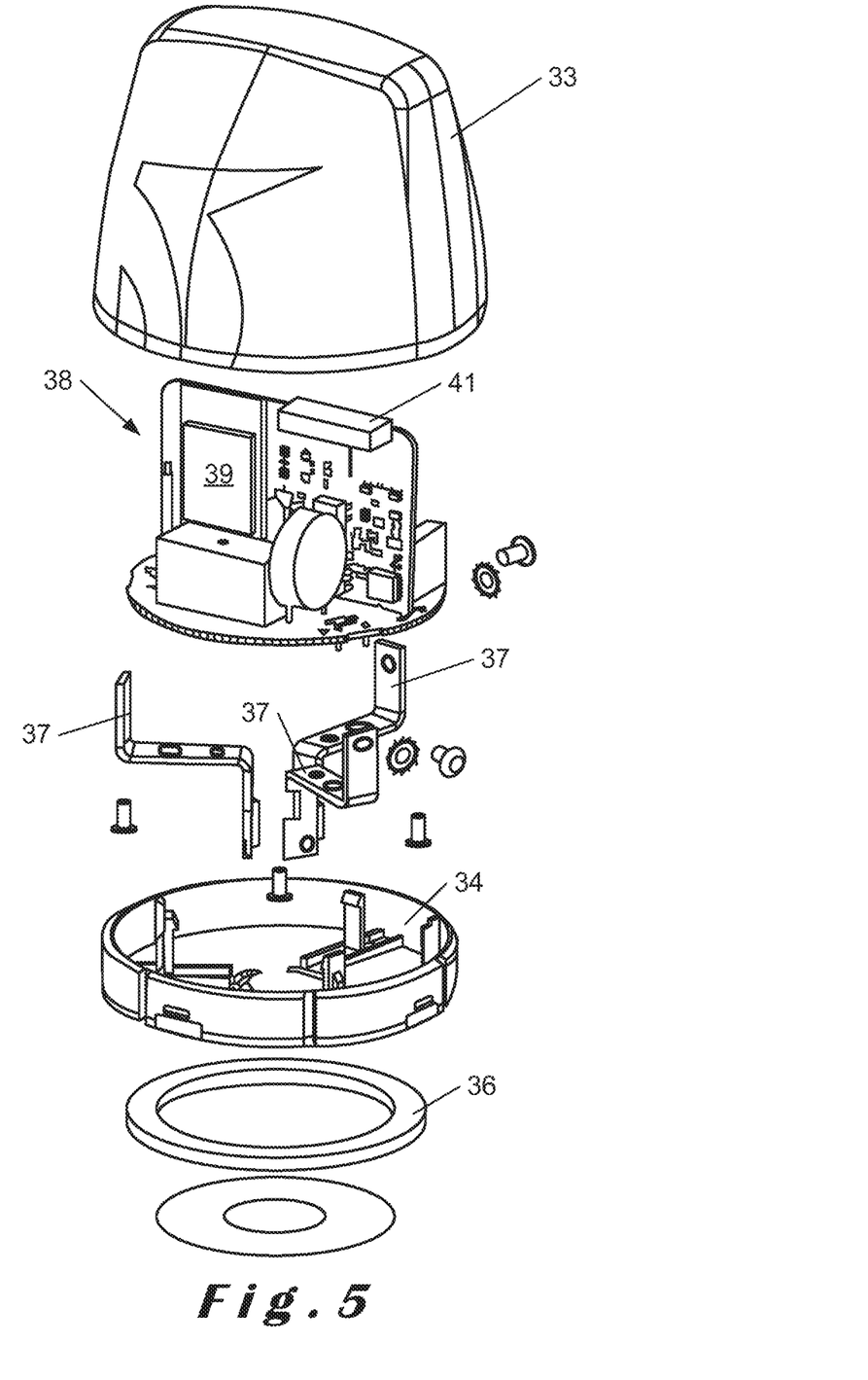
FIG. 5: a component of an object according to this invention.

This figure does not show an RFID reader, which can be installed in a base on the light housing side in order to register light-specific data of an RFID transponder in the near field.

Figure 6:
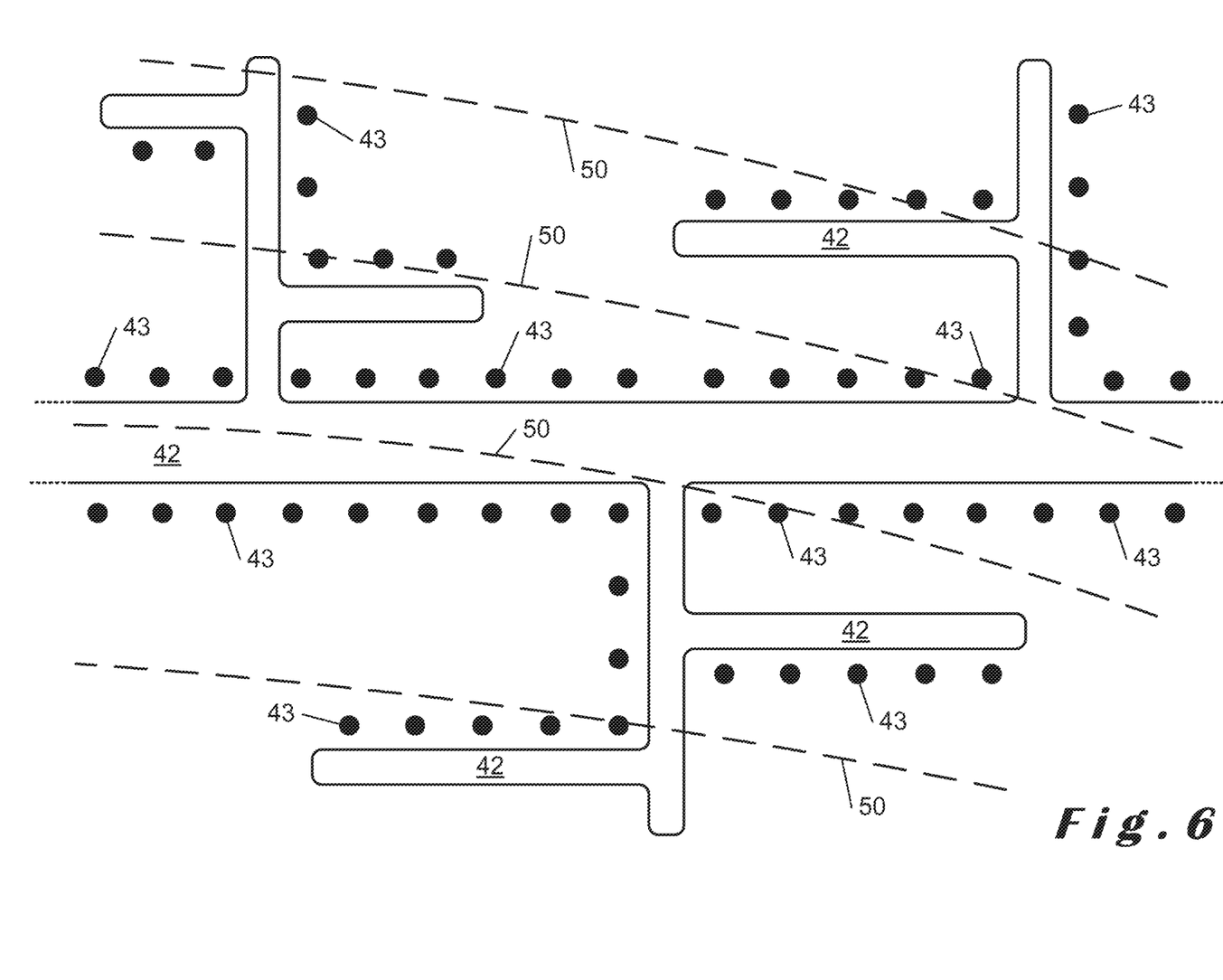
FIG. 6 shows a further subject matter according to the invention.

The depiction according to FIG. 6 illustrates a road system having a plurality of roads 42 of a length of several hundred metres. These roads are lined by a multiplicity of street light lights 43 with respective control modules. The control modules are each provided with sensors for detecting seismic waves. These may be simple acceleration sensors, on the one hand. Alternatively, more complicated seismometers may also be used in a manner integrated in the street light. The data emanating from the acceleration sensors, which are preferably integrated in the control module directly inside the housing, can be transmitted to the server via the group controller and its long-range communication module. As a result, it is possible to detect seismic waves even in the case of relatively inaccurate sensors on account of the multiplicity of signals transmitted by said sensors and to analyse them in a spatially and temporally resolved manner in the server on the basis of the geocoordinates to be concomitantly transmitted by the control modules and the group controller. This results in a comparatively accurate depiction of the earthquake progress even with a poor resolution of the P waves and/or S waves. Accordingly, information relating to the epicenter of the earthquake can also be extracted from the information. This can happen either on the server of the network or on a special server assigned to an earthquake centre. Accordingly, a subsequent tsunami warning or else an earthquake warning may also result via control of the luminaires, for example by emitting light signals previously disclosed to the population. These may be, for example, wave-like light signals of alternating and propagating luminosities which run along the road.

By integrating a street light according to FIG. 7 in the ground and permanently arranging and connecting said street light to the ground using a layer of lean concrete 44, a foundation pipe 45 and dense filling material 46, for example, acceleration sensors arranged in the control module in or on the luminaire head 48 can effectively pick up the seismic waves propagating in the soil or along its surface via the mast 49. Alternatively or additionally, a more finely resolving seismometer 52 may also be arranged in the base of the mast 49, which seismometer is connected to the control module 2 via a data line (not shown). A great advantage of the system is the evaluation of a multiplicity of sensors which are distributed over a large area, which evaluation can be carried out virtually at the same time and enables an analysis in order to detect seismic waves 50 illustrated using dashed lines in FIG. 6. At the same time, an information system which can be used to simultaneously inform a multiplicity of road users is possible.

EMBODIMENTS

1. Method for expanding of a network of lights including the steps of:
providing a network of lights comprising a plurality of street lights, each street light having a control module associated therewith, each control module comprising:
one long-distance communication module,
one short-distance communication module,
a geocoordinate module,
a controller,
each control module being operable for providing a control output for controlling a driver of an associated light,
providing at least one server (4) reachable via the long-distance communication module,
dividing the control modules (1,2,23,23',28,28') into multiple control module groups (A,B) based on at least one of: environmental, light and control module information provided by the control modules (1,2,23,23',28,28'),
selecting one of the control modules (1,2,23,23',28,28') of each group (A,B) as a group controller (2,23',28'), with which all other control modules (1,23,28) of this group (A,B) can communicate via their short-distance communication modules,
forming a short-distance network with the control modules (1,2,23,23',28,28') within the group, via their corresponding short-distance communication modules,
transmitting, during normal network operation, from the group controller (2,23'28,') to the server (4) at least one of: its own environmental, light and control module information and the corresponding information coming from the other control modules,
adding a new control module in the network of lights by:
registering geo-information of the new control module when said new control module is first commissioned and started-up,
logging in by said new control module to a network provider via the long-distance communication module, and
transmitting to the server the geo-information together with at least one of: control module and light-specific information.

2. The method according to embodiment 1, wherein the new control module is first commissioned and started-up when voltage is first applied.

3. The method according to embodiment 1 or 2, wherein the step of logging in of said new control module to a network provider is performed under roaming conditions, 4. The method according to any one of the preceding embodiments, wherein the short-distance network comprises a mesh network.

5. The method according to any one of the preceding embodiments, wherein the network provider is a cellular network provider.

6. The method according to any one of the preceding embodiments, wherein each control module includes a near-field communication module.

7. The method according to any one of the preceding embodiments, further including the step of transmitting specific network provider log-in data for a locally available long-distance network to a new control module after the transmission of its geographic coordinates and the time stamp together with at least one of: control module and light-specific information associated with said new control module.

8. The method according to embodiment 7 wherein the network provider (14) log-in data has been made available via a firmware for an electronic SIM of the new control module.

9. The method according to any one of the preceding embodiments, further comprising the step of transmitting information concerning the new control module to the network provider via an interface to said network provider (14).

10. The method according to any one of the preceding embodiments, further including the step of providing the control modules of one group with software updates by a software transferred from the server (4) to the associated group controller.

11. The method according to any one of the preceding embodiments, further including the step of receiving, at the new control module, controller firmware from the server (4).

12. The method according to any one of the preceding embodiments, further including the step of receiving, at the new control module, from the server (4) a parameter set for operating the light.

13. The method according to any one of the preceding embodiments, further including the step of operating, using the control module, the light at different brightness levels over a predetermined or determinable time interval after voltage is applied.

14. The method according to any one of the preceding embodiments, further including the steps of:
allocating the new control module to a group (A,B) and informing the group controller (1,23',28') about the new control module.

15. The method according to any one of the preceding embodiments, further including the steps of:
receiving, using at least a part of the control modules (1,2,23,23',28,28'), information about adjacent control modules (1,2,23,23',28,28') via the short-distance communication module, depending on the number of new control modules, the closeness of the new control modules, the distance of new control modules from the group controller and/or the frequency of disruptive events,
registering, using at least a part of the control modules (1,2,23,23',28,28'), the quality of the connection to the adjacent control modules,
transmitting this information to the server (4) via their short-distance communication module and the group controller (2,23'28') or directly via their long-distance communication module,
performing, using the server, at least one of the following steps: making the group division and allocating the group controller, checking the group division and group controller allocation and changing the group division and group controller allocation.

16. The method according to embodiment 14, wherein the registration of adjacent module information is time-limited.

17. The method according to any one of the preceding embodiments, wherein the division into groups (A,B) and/or allocation of the group controller (2,23'28') on the server is carried out automatically.

18. The method according to any one of the embodiments 1 to 17, wherein the division into groups (A,B) and/or allocation of the group controller (2,23'28') is variable through user input.

19. The method according to any one of the preceding embodiments, wherein each group (A,B) is allocated an equal number of control modules or fewer control modules than a specific number.

20. The method according to embodiment 19, wherein the specific number is 200.

21. The method according to any one of the preceding embodiments, wherein the selection of a control module as group controller (2,23'28') is based on fuzzy control strategies.

22. The method according to any one of the preceding embodiments, further including the step of suspending or deactivating a control module.

23. The method according to the embodiment 21 or 22, wherein the selection of a control module as group controller takes into account rules for at least one of:
a) the ratio of active to inactive control modules,
b) the availability of adjacent control modules in the short-distance network,
c) the number of network malfunctions,
d) the network changes,
e) the changes of connection quality in the short-distance network,
f) the estimated cost of connection to the long-distance network provider,
g) the communication of sensor data between adjacent groups,
h) the latency,
i) the failure and replacement of active group controllers, and
j) a stabilisation component to take into account a time-controlled damping.

24. The method according to embodiment 23, wherein the rules are mapped and linked by an AI.

25. The method according to any one of the preceding embodiments, further comprising the steps of:
defining at least one replacement group controller, this step being performed by the server and according to control strategies,
switching of the at least one replacement group controller from a suspended to an active state if the current group controller (2,23',28') fails.

26. The method according to any one of the preceding embodiments, further comprising the step of automatically scanning, using the new control module, the short-distance network for other control modules when the new control module is first switched on.

27. The method according to any one of the preceding embodiments, further comprising the step of reading out information mediums located on one part of the light for registering light-specific information said step of reading out being performed by the new control module automatically and/or after the new control module has been triggered.

28. The method according to embodiment 27, wherein the information medium being read out via the near field communication module of the new control module.

29. The method according to any one of the preceding embodiments, further comprising the steps of:
linking the light-specific information of the light allocated to the new control module to an inventory list,
displaying, at least partially, the contents of the inventory list.

30. The method according to any one of the preceding embodiments, further comprising the step of transmitting, using the control modules (1,2,23,23',28,28'), data concerning at least one of: their UID in the short-distance network, their IP address in the long-distance network, light-specific information, data of up to 50 adjacent control modules in the short-distance network including their UIDs, data of up to 10 adjacent control modules in the short-distance network including their UIDs and the connection quality of the adjacent control modules to the server.

31. Network of lights comprising a plurality of luminaires, each luminaire being a street light and having a control module (1, 2, 23, 23', 28, 28') associated therewith, each of the control modules (1, 2, 23, 23', 28, 28') comprising:
a long-range communication module,
a short-range communication module,
a geocoordinates module, and
a controller (39),
each control module being operable for providing a control output for controlling a driver of the luminaire, the control output comprising control signals for the driver of a luminous means of the associated luminaire, and at least one server (4) reachable via the long-range communication module,
the network being expanded in accordance with any one of the preceding embodiments.

The invention claimed is:

1. Network of lights, the lights of the network of lights being distributed into one or several groups, each group comprising at least a first and a second lights, each of the first and second lights being equipped with a control module operable for providing a control output for controlling a driver of an associated light and comprising a long-distance communication module, a short-distance communication module, a geocoordinate module and a controller,
   wherein the lights of a group form a short-distance network for communication using the short-distance communication modules,
   wherein the first and the second lights are configured to transmit outside of their group, using the long-distance communication module, at least one of their own environmental, light and control module information, and at least one of the environmental, light and control module information transmitted from the other lights via the short-distance network,
   wherein the first and second lights are configured to communicate between different groups of lights directly by the short-distance communication module of their control module.

2. Network according to claim 1, wherein a new control module added to the network is configured to scan the short-distance network for other control modules.

3. Method for operating a network of lights, the lights of the network of lights being distributed into one or several groups, each group comprising at least a first and a second lights, each of the first and second lights being equipped with a control module operable for providing a control output for controlling a driver of an associated light and comprising a long-distance communication module, a short-distance communication module, a geocoordinate module and a controller,
   wherein at least the first and second lights are configured to communicate with the other lights of their group using the short-distance communication module, and to communicate outside their group using the long-distance communication module,
   wherein, at a time, for each group, only one of the at least first and second lights communicates outside said group.

4. Method according to claim 3, wherein, in case of failure of the one of the at least first and second lights that communicates outside said group, it is replaced by the other one of the at least first and second lights that are configured to communicate outside said group.

5. Method according to claim 3, comprising a selection of the at least one of the first and second lights that communicates outside said group.

6. Method according to claim 5, wherein said selection is based on at least one rule for:
   a ratio of active to inactive control modules,
   an availability of adjacent control modules in said group,
   a number of network malfunctions,
   a network change,
   a changes of connection quality in said group,
   a communication of sensor data between adjacent groups,
   a latency within said group.

7. Method according to claim 3, wherein said groups are based on at least one rule for:
   a ratio of active to inactive control modules,
   an availability of adjacent control modules in said group,
   a number of network malfunctions,
   a network change,
   a changes of connection quality in said group,
   a communication of sensor data between adjacent groups,
   a latency within said group.

8. Method according to claim 3, wherein the lights of a group form a short-distance network for communication using the short-distance communication modules.

9. Method according to claim 8, wherein a new control module added to the network scans the short-distance network for other control modules.

10. Method according to claim 3, wherein a new control module added to the network receives a parameter set for operating the light.

11. Method according to claim 3, comprising a transfer of information between control modules of different groups.

12. Method according to claim 11, comprising a selection of the control modules for transferring information between different groups.

13. Method according to claim 3, wherein the control modules read, with an RFID reader, an RFID transponder included in the associated light.

14. Method according to claim 3, wherein a new control module added to the network is allocated to a group, and wherein at least one of the at least first and second lights is informed about the new control module.

15. Network of lights, the lights of the network of lights being distributed into one or several groups, each group comprising at least a first and a second lights, each of the first and second lights being equipped with a control module operable for providing a control output for controlling a driver of an associated light and comprising a long-distance communication module, a short-distance communication module, a geocoordinate module and a controller,
   wherein the at least first and second lights are configured to communicate with the other lights of their group using the short-distance communication module, and to communicate outside their group using the long-distance communication module,
   wherein the first and second lights are configured to communicate between different groups directly by the long-distance communication module of their control module.

16. Network of lights according to claim 15, wherein the first and second lights are configured to communicate between different groups of lights by the short-distance communication module of their control module.

17. Network of lights comprising a server and at least a first and a second lights, each of the first and second lights being equipped with a control module operable for providing a control output for controlling a driver of an associated light and comprising a long-distance communication module, a short-distance communication module, a geocoordinate module and a controller,
   wherein the at least the first and the second lights are configured to transmit to the server, using their long-distance communication module, at least one of their own environmental, light and control module information, and at least one of the environmental, light and control module information received, via their short-distance communication module, from other lights,
   wherein the control modules comprise an RFID reader and the lights comprise an information medium registering light-specific information and an RFID transponder readable by the RFID reader.

18. Network of lights according to claim 17, wherein the transmission to the server uses a cellular network.

* * * * *